J. P. FISHER.
MEANS FOR CONTROLLING ORIFICE METERS.
APPLICATION FILED SEPT. 20, 1915.

1,287,273.

Patented Dec. 10, 1918.
3 SHEETS—SHEET 3.

WITNESSES

INVENTOR

UNITED STATES PATENT OFFICE.

JAMES P. FISHER, OF BARTLESVILLE, OKLAHOMA.

MEANS FOR CONTROLLING ORIFICE-METERS.

1,287,273.  Specification of Letters Patent.  Patented Dec. 10, 1918.

Application filed September 20, 1915. Serial No. 51,617.

*To all whom it may concern:*

Be it known that I, JAMES P. FISHER, residing at Bartlesville, in the county of Washington and State of Oklahoma, a citizen of the United States, have invented or discovered certain new and useful Improvements in Means for Controlling Orifice-Meters, of which improvements the following is a specification.

In an application filed September 20th, 1915, Serial Number 51618 herewith is described and claimed a construction of orifice meters whereby different sized orifices may be brought into the line of flow of fluids in a pipe line. The invention described herein relates to mechanism for effecting a change of measuring orifices in accordance with variations of the differential of pressures on the supply and discharge sides of the orifice. This changing of orifices may be not only controlled by the fluid being measured but may also be effected by such fluid. The invention is hereinafter more fully described and claimed.

Figure 1:
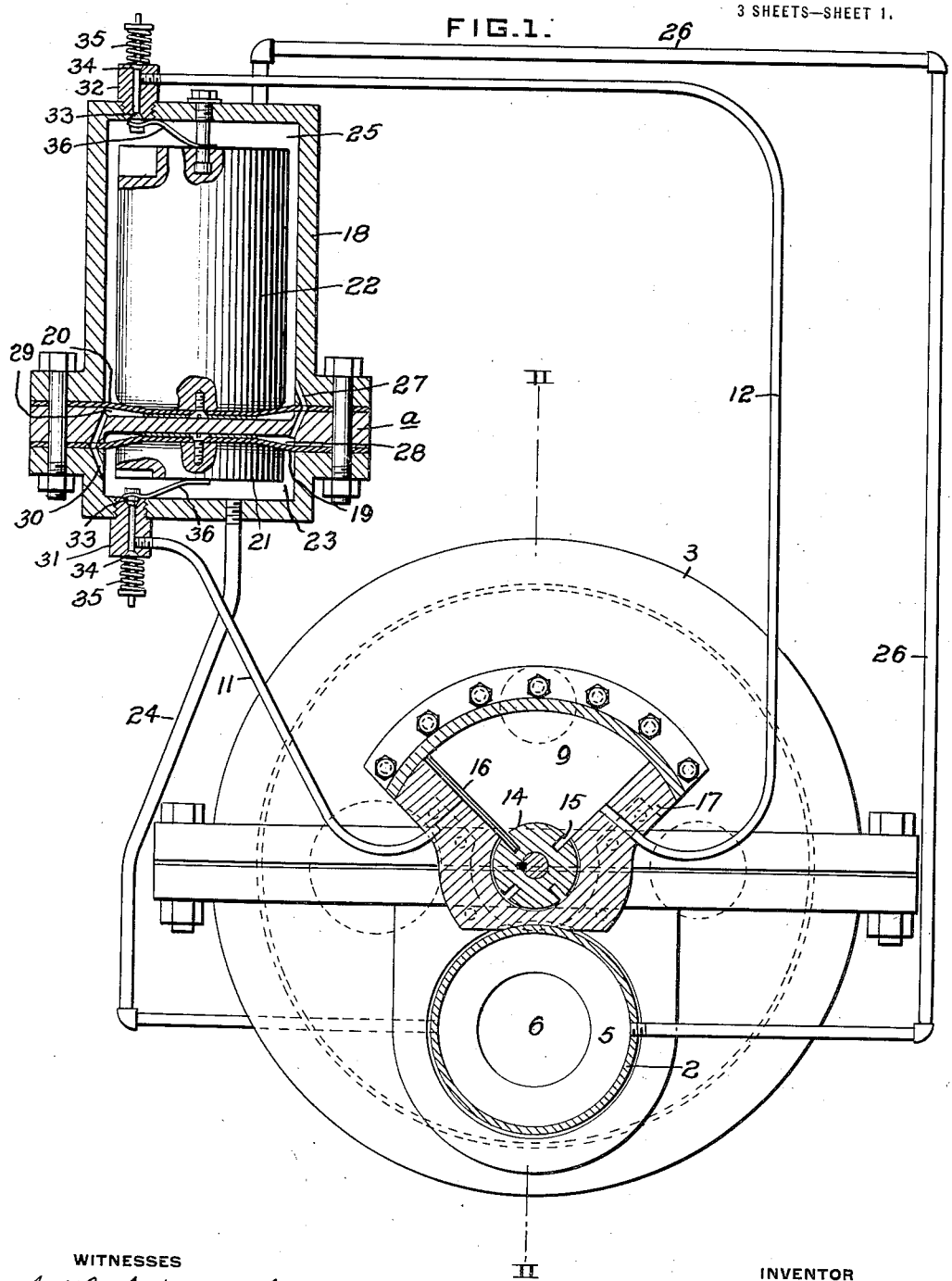
Figure 2:
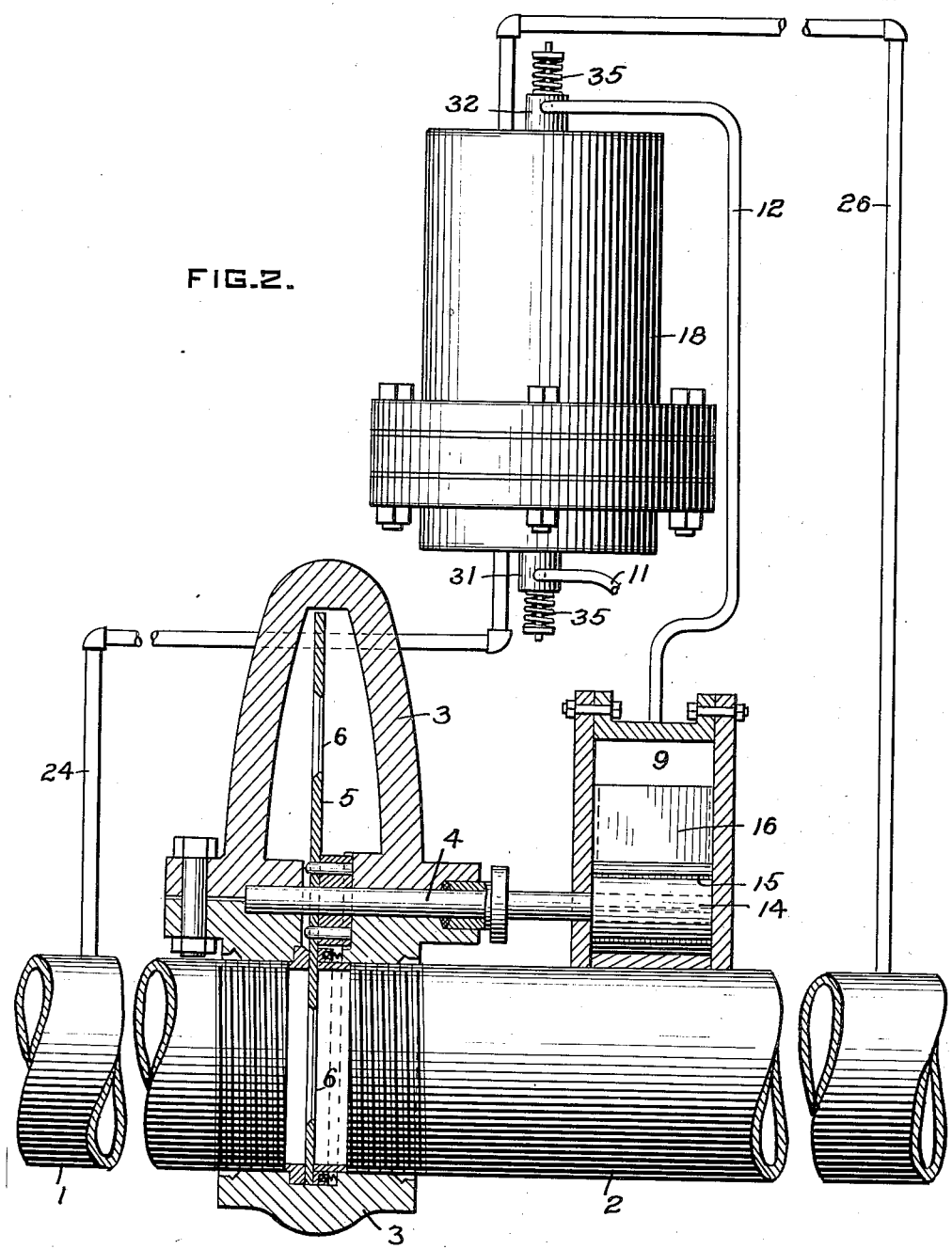
Figure 3:
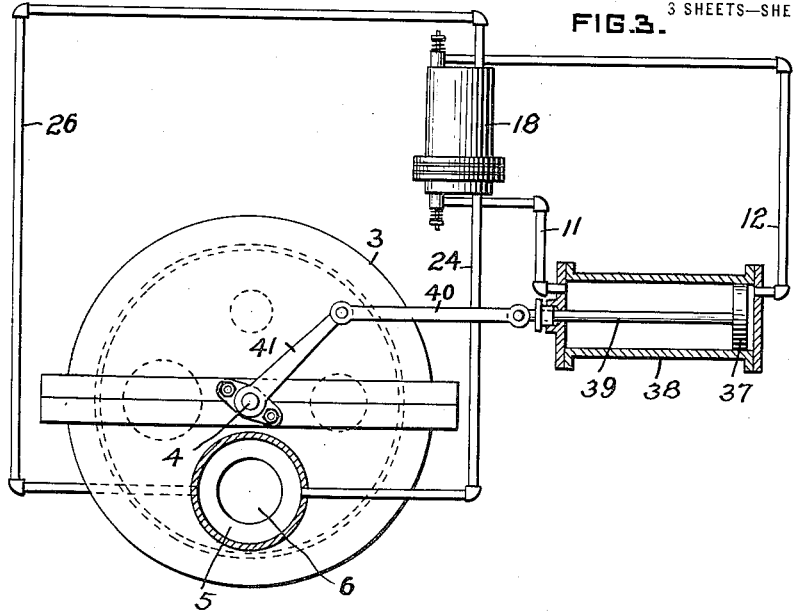
Figure 4:
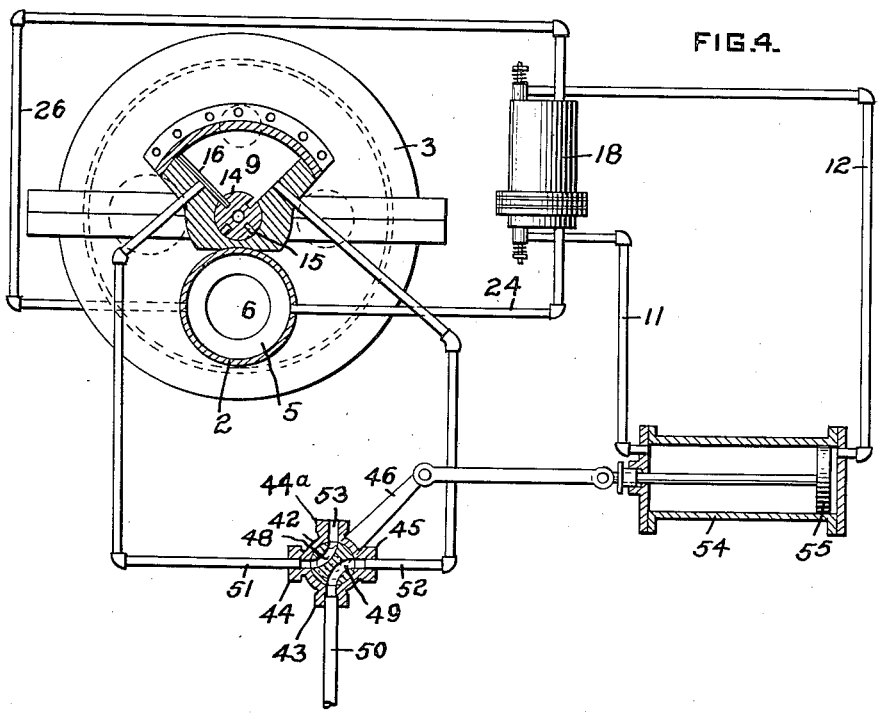

In the accompanying drawings forming a part of this specification, Figure 1 is a view partly in section and partly in elevation showing my improvement in connection with an improved orifice meter; Fig. 2 is a sectional view, the plane of section being indicated by the line II—II, Fig. 1; Fig. 3 is a view similar to Fig. 1 illustrating an alternative form of motor, and Fig. 4 illustrates a further modification of the improvement.

As described and shown in said application, the meter consists of a disk or plate 5 having orifices 6 differing in size and inclosed in a housing 3, the opposite sides of said housing being provided with alined openings for the reception of the ends of adjacent pipe sections 1 and 2 through which the fluid is conducted. As in the preferred form of meter, the plate or disk 5 is made circular and is secured on a shaft 4 mounted in suitable bearings and having one end projecting outside of the housings, and the improvement claimed herein will be shown as adapted to rotate the shaft carrying the circular plate or disk 5, but in the broadest sense, the invention is not limited to such specific construction, as such changes as will adapt the improvements described herein to the operation of other forms of the improved meter described and shown in said application, will readily suggest themselves to one skilled in the art.

On the projecting end of the shaft 4 is secured a hub 14 having a plurality of radial slots 15 for the reception of a wing 16. The hub and wings are inclosed in casting 17 having a sector-like chamber in which the wing can swing, and in its movement turn the shaft and the disk or plate of the meter. Pipes 11 and 12 extending from a controlling mechanism hereinafter described, are connected respectively to opposite sides of the chamber, so that when fluid under pressure is admitted through one pipe, the wing will be shifted in one direction, and in the opposite direction when pressure is admitted through the other pipe. By reference to Fig. 1, it will be seen that the slots 15 in the hub have the same spaced relation as the orifices in the disk of the meter, but are intermediate of adjacent orifices, so that by the shifting of the wing, one or the other of the orifices will be brought to operative position.

The controlling mechanism consists of a shell 18 divided into two chambers by a transverse partition $a$. Flexible diaphragms 19 and 20 are arranged in the respective chambers, the diaphragm 19 having a weight 21 suspended therefrom, and the diaphragm 20 supporting a heavier weight 22. The chamber 23 under the diaphragm 19 is connected by a pipe 24 to the line of pipe in which the orifice plate is arranged at a point on the high pressure side of such plate, and the chamber 25 above the diaphragm 20 is connected by a pipe 26 to the line of pipe at a point on the low pressure side of the orifice plate. The chamber 25 is connected by a port 27 to a chamber 28 intermediate the diaphragm 19 and the fixed transverse partition $a$ in the shell, so that equal pressures are maintained in the chambers 25 and 28 and equal but higher pressures are maintained in chambers 23 and 29 below diaphragm 20 through the port 30. This construction insures that the diaphragm will be subjected to the same differences in pressure as exist on opposite sides of the orifice plate of the meter, and that the higher pressure will in both cases be below the diaphragms 19 and 20, and the low pressure above the same. The weight 21 carried by the lower diaphragm 19 is so proportioned relative to a predetermined differential in the line of pipe that the weight will be normally raised, but the weight 22 carried by the upper diaphragm 20 is made sufficiently heavy relative to the said predetermined differential to be normally in its lower position. The pipes 11 and 12 are connected to the chambers 23 and 25 through passages in plugs 31 and 32, said passages opening at one end into the respective chambers while the opposite ends are open to the atmosphere. At the ends of the passages are arranged valves 33 and 34 so connected that when one valve is open, the other will be closed. The valves 33 controlling the flow of fluid from the chambers 23 and 25 to the chamber or cylinder of the orifice plate motor are held normally closed and the exhaust valves 34 open by springs 35. These valves are shifted from normal positions on a change of differential in the pipe line through the medium of levers 36 actuated by the weights 21 and 22.

When the differential in the pipe line drops below a desirable predetermined value, lowering the pressure in chamber 23, the weight 21 will move down, opening the valve 33, thereby permitting fluid under pressure to flow through the pipe 11 into the motor chamber 9 and shift the wing or piston 16 to opposite position. By this movement of the wing or piston, the meter plate 5 is turned bringing a smaller orifice into the line of flow of fluid through the pipe line. These relative positions of the several parts will be maintained until pressure has been built up to reëstablish the desired differential, whereupon the weight 21 will be raised to normal position and the valve 33 closed by its spring, the exhaust valve 34 being simultaneously opened.

This lifting of the weight 21 and closing of valve 33 will not affect the orifice plate, and as a relatively smaller orifice is in the line of flow of fluid through the pipe line, the pressure will continue to build up beyond a point where the differential will be above the desired value but as soon as such pressure increases to a point where the differential is greater than necessary for easy reading, this increase of pressure will operate on the underside of diaphragm 20 raising weight 22 and thereby opening the valve 33 and permitting the flow of fluid under pressure to the chamber 9 to shift the wing or piston 16 so as to bring a larger orifice into the line of flow of fluid through the pipe line.

While the form or construction of motor having an oscillating piston shown in Fig. 1 is a convenient means for shifting the orifice plate, other forms of motors may be employed but preferably of a type capable of being controlled in accordance with differences of pressure on opposite sides of the orifice plate. As for example a fluid pressure motor having a reciprocating piston 37 may be employed as shown in Fig. 3. The opposite ends of the cylinder 38 are connected by pipes 11 and 12 to the controller, as in the construction shown in Fig. 1, and the piston rod 39 by a link 40 to an arm 41 secured to the shaft 4 carrying the orifice plate 5.

In some cases the pressure of the fluid flowing through the pipe line will not be sufficient to operate the motor employed for shifting the orifice plate. Under such conditions a fluid under higher pressure is employed. In such cases a suitable form or construction of relay valve mechanism is employed, such for example as that shown in Fig. 4, consisting of a shell 42 having nipples 43, 44, 45 and 44ª adapted to be connected respectively to a source of fluid under sufficient pressure to operate the orifice plate motor, to opposite sides or ends of the motor chamber or cylinder, and the fourth from the exhaust port. The plug of the valve is provided with passages 48 and 49 adapted to connect adjacent ports 50, 51, 52 and 53. This valve mechanism can be so constructed as to be capable of being easily shifted by a small fluid pressure cylinder 54 and piston 55 as shown in Fig. 4, or the type of motor shown in Fig. 1 for operating the orifice plate may be employed. As shown in Fig. 4, the cylinder or motor chamber of the valve operating mechanism is connected to the controller in the same manner as the orifice plate motor in Figs. 1 and 3.

While the forms or constructions of motor and controlling mechanism shown and described herein are well adapted for the purposes indicated, the invention is not limited to such specific constructions, the object of the invention being in its broadest sense the automatic changing of the orifices by and in accordance with changes of pressure on the high pressure side of the orifice and the utilization of the fluid being measured for controlling through suitable mechanical devices, such automatic changing of the orifices.

As shown and described in application Serial Number 51,618 hereinbefore referred to, the mechanism herein described would have a recording differential gage connected to the pipe line on both sides of the orifice plate, as for example, by the pipes 24 and 26 and a recording static pressure gage on one of said connections. A drop to zero on the chart of the differential gage will indicate a movement in the orifice plate, to bring a different size of orifice in operative position. If after the drop to zero, the record is on a higher reading than that preceding the drop, the change indicates that a smaller orifice has been substituted for a large one, but if the record, after the drop, shows readings lower than prior thereto, a large orifice has been substituted for a smaller one.

I claim herein as my invention:

1. In an orifice meter, the combination of a plate provided with a plurality of orifices differing in area, and means controlled by variations in the difference of pressures of the fluid being measured on opposite sides of the orifice plate for shifting said plate.

2. In an orifice meter, the combination of a plate provided with a plurality of orifices differing in area, and fluid pressure means for shifting said plate.

3. In an orifice meter, the combination of a rotatable plate having a plurality of orifices differing in area, and a motor having a reciprocating member for turning said plate.

4. In an orifice meter, the combination of a rotatable plate having a plurality of orifices differing in area, a fluid pressure motor for turning said plate and a controlling mechanism operative by variations in the difference of pressures of the fluid being measured on opposite sides of the orifice plate for controlling the motor.

5. In an orifice meter, the combination of a plate having a plurality of orifices differing in area, and a motor operating by changes of pressure of the fluid being measured for shifting said plate.

6. As a means for regulating orifice meters, the combination of an orifice plate, a motor adapted to be connected to the orifice plate of such meter, a controller for said motor consisting of two diaphragms each subjected on opposite sides to different pressures, and valves operative by said diaphragms controlling the flow of fluid pressure to the motor.

7. An orifice meter having a movable orifice plate in combination with a fluid pressure motor for shifting said orifice plate, a valve mechanism controlling the flow of fluid pressure to the motor, and means controlled by differences of pressure on opposite sides of the orifice plate for shifting said orifice mechanism.

In testimony whereof I have hereunto set my hand.

JAMES P. FISHER.

Witnesses:
R. K. TALLANT,
W. W. HILL.